April 2, 1957 A. D. FERGUSON ET AL 2,787,069

RECORDING DEVICE

Filed Nov. 15, 1954

Inventors
Arthur D. Ferguson
& Dean W. Gookin
by Talbert, Dick & Adler
Attorneys Witness
Edward P. Sedley United States Patent Office 2,787,069

Patented Apr. 2, 1957

2,787,069

RECORDING DEVICE

Arthur D. Ferguson, Des Moines, Iowa, and Dean H. Gookin, Rock Springs, Wyo.

Application November 15, 1954, Serial No. 468,638

4 Claims. (Cl. 40—70)

This invention relates to a means for recording data and more particularly to a device that may be carried in the pocket or purse.

There are many instances where individuals wish to maintain a record, either stable or continuing, on some activity, operation or like. This is particularly true in the operation of automotive vehicles, wherein it is desirable to keep track of such matters as gallons of fuel consumed, cost of same, amount of lubricants used, and like. There have been heretofore, rotatable dial disk indicia means, with the values observable through a window or windows. However, such previous devices have the disks protruding from one side of the base portion for manual adjustment. Thus such devices cannot be carried without the accidental rotation of the disks and thereby destroying the record. Also the disks are not yieldingly held in their set positions. Furthermore, they are not of compact construction.

Therefore, the principal object of our invention s to provide a small data recorder that will main its setting without accidental change even though the same be carried on the person, in the purse, or in the glove compartment of the vehicle.

A further object of this invention is to provide a recording device that is easily operated.

A still further object of our invention is to provide a compact recording device capable of recording a number of facts.

Still further objects of this invention are to provide a data recording device that is economical in manufacture, durable in use, and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

Figures 1, 2, 3, 4, 5:
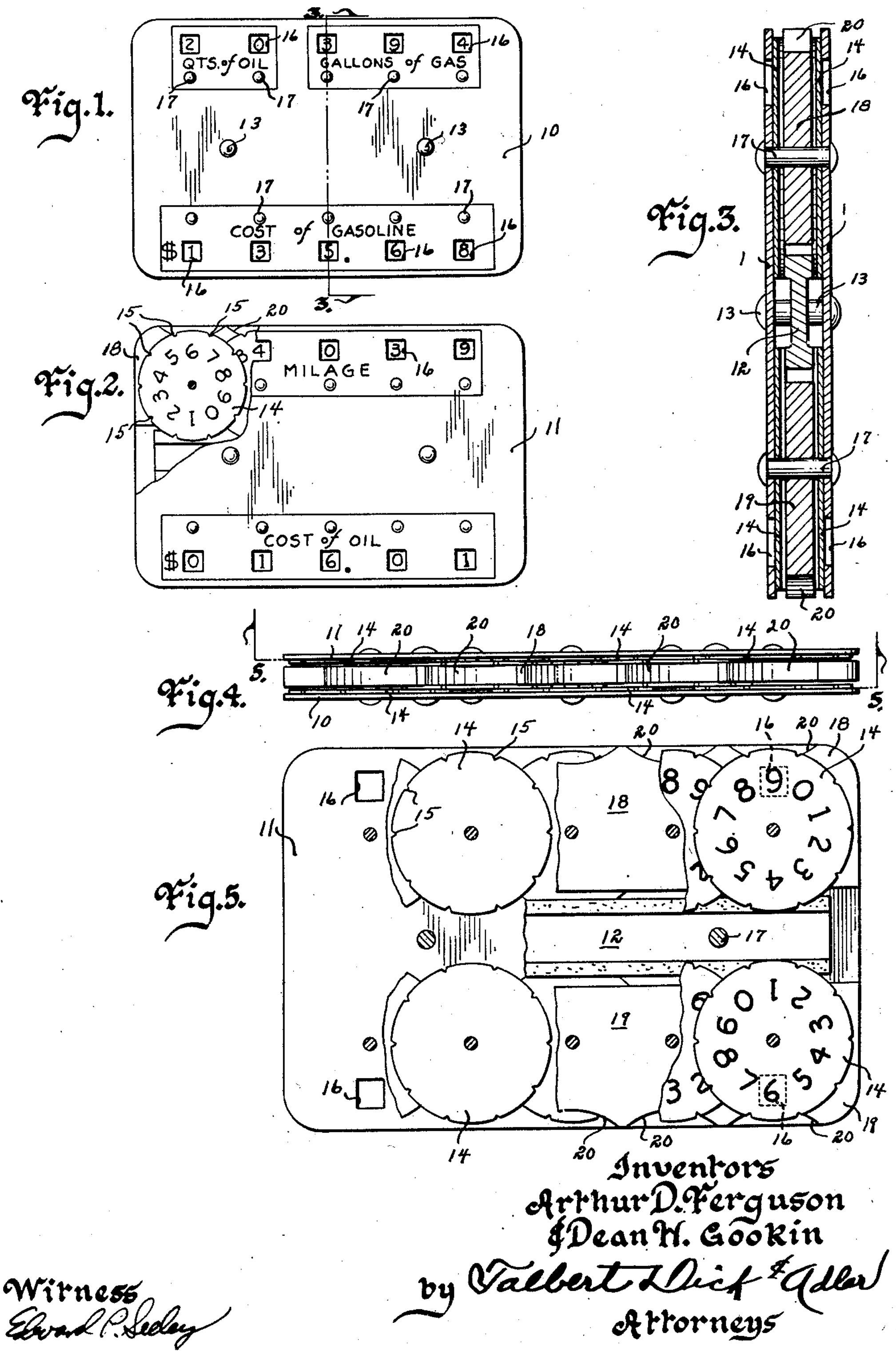
Fig. 1 is a side view of our device.
Fig. 2 is a side view of the device opposite from the side view of Fig. 1.
Fig. 3 is an enlarged cross sectional view of our recorder taken on line 3—3 of Fig. 1.
Fig. 4 is an enlarged top edge plan view of the device.
Fig. 5 is an enlarged side view of the recorder with sections cut away to more fully illustrate its construction.

In these drawings we use two spaced apart side plates 10 and 11, substantially rectangular in shape. Extending horizontally between the two plates is an ordinary double sided bar magnet 12. This magnet and plates are held together by spacing washers and rivets 13 as shown in Fig. 3. Any number of movable disks and windows in the side plates may be employed. If desired the device may have only one disk and one window, or may have a great number of disk dials and windows. In the drawings we have twenty disks and twenty windows. Inasmuch as all of the disks and their adjacent windows are duplicates of each other, we will describe only one unit in detail. The numeral 14 designates a plurality of dial disks each having a continuous row of numerals such as 1, 2, 3, 4, 5, 6, 7, 8, 9 and 0. Each disk has a plurality of evenly spaced apart notches 15 in its periphery as shown in Fig. 5. In the drawings we show five disks adjacent the inside top portion of the plate 10, five disks adjacent the inside bottom portion of the plate 10, five disks adjacent the inside top portion of the plate 11, and five disks adjacent the inside bottom portion of the plate 11. The numerals of each disk are each capable of individually selectively being observed through a window 16 in the plates 10 or 11. To make this selection possible each disk is rotatably mounted on a rivet 17 extending through both plates 10 and 11. One rivet will serve as a shaft for two disks, inasmuch as these disks, from front to back, are in pairs as shown in Fig. 4. When the disk dials are installed, their peripheries are all within the plane of the two sides 10 and 11, as shown in Fig. 5. This is most important and one of the principal features of this invention. Also to conserve space the adjacent disks of each of the four rows of disks overlap each other as shown in Figs. 2, 3, 4 and 5. The dimensions of the parts of our device are such that each disk dial, which is of suitable metal, will engage the bar magnet 12 as shown in Fig. 3. By such contact the disks will be securely yieldingly held in any position they are manually placed. Between the two upper rows of disks is a spacer bar 18 and between the two lower rows is a like spacer bar 19 as shown in Fig. 3. The various rivets 17 also extend through these two spacer bars 18 and 19 and thus they are held between the two side plates 10 and 11 and parallel with the bar magnet. These upper and lower spacer bars are within the confines of the two side plates and each is of a thickness substantially that of the thickness of the bar magnet. Due to the position of a spacer bar between each oppositely positioned disk that make up a transverse pair, we have formed a circular concave depression 20 in the edge of such spacer bar, common to and between each oppositely positioned pair of disks so that the outer periphery portion of such disks are exposed. As the edges of these disks, the edges of the sides 10 and 11, and the spacer bars, form the top and lower edges of the device, the depressions 20 will be centrally located between the two side plates and will form concave tracks, each extending from the device's edge, first downwardly and then upwardly in a curved track path. Inasmuch as these depressions 20 will extend below the disk periphery a peripheral area of the disk will be exposed even though it is completely within the confines of the two side plates as shown in Fig. 2. By this arrangement of parts, when it is desired to turn a given disk, any narrow elongated item such as a pencil point, nail, toothpick, match stick or like, is inserted into the adjacent depression 20, the notch 15 of the selected disk is engaged by the same and by drawing the instrument through the depression the disk will be rotated accordingly. As a matter of fact the pick instrument will automatically follow the arcular depression like it is a track and the disk will be rotated in the direction the instrument (pencil or like) is drawn. Thus the disk may be rotated in either desired direction. The manual operation will be natural, i. e., a circular pick motion, down and then up. By the notches 15 being spaced apart a distance substantially that of the bottom distance of a depression 20, one pick action will move the disk one notch, or one more progressive number visible through the respective window.

From the foregoing it will be appreciated that we have provided a recording device that has disks shielded against accidental contact and movement, that is compact, and when once set will remain set until it is desired to reset the same to a different value. While the device may be used for recording any data desired to be recorded, we find vehicle operation indicia a desirable media for its use. In the drawings we show disk dials for recording the number of gallons of gasoline used, the cost of same, the mileage, the oil used and its cost.

Some changes may be made in the construction and arrangement of our recording device without departing from the real spirit and purpose of our invention, and it is our intention to cover by our claims, any modified forms of structure or use of mechanical equivalents which may be reasonably included within their scope.

We claim:

1. In a device of the class described, two spaced apart plates at least one of which has a window, a disk rotatably mounted between said two plates and having its periphery area completely shielded by said two plates, indicia on said disk selectively readable through said window, notches in the periphery of said disk, a spacer member between said two side plates and adjacent the peripheral area of said disk, and a circular track depression in said spacer member exposing a portion of the peripheral area of said disk for guiding a tool into an adjacent notch of said disk for rotating said disk a predetermined distance.

2. In a device of the class described, two spaced apart plates at least one of which has a window, a disk rotatably mounted between said two plates and having its periphery area completely shielded by said two plates, indicia on said disk selectively readable through said window, a plurality of evenly spaced apart notches in the periphery of said disk, a spacer member between said two side plates and adjacent the peripheral area of said disk, and a circular track depression in said spacer member exposing a portion of the peripheral area of said disk for guiding a tool into an adjacent notch of said disk for rotating said disk a predetermined distance.

3. In a device of the class described, two spaced apart plates at least one of which has a window, a disk rotatably mounted between said two plates and having its periphery area completely shielded by said two plates, indicia on said disk selectively readable through said window; said disk being of a material that is attracted to a magnet, and a magnet between said two plates and in contact with said disk, a spacer member between said two side plates and adjacent the peripheral area of said disk, and a circular track depression in said spacer member exposing a portion of the peripheral area of said disk.

4. In a device of the class described, two spaced apart plates at least one of which has a window, a disk rotatably mounted between said two plates, indicia on said disk selectively readable through said window; said disk being of a material that is attracted to a magnet, and a magnet between said two plates and in contact with said disk.

References Cited in the file of this patent

UNITED STATES PATENTS

| | | |
|---|---|---|
| 350,577 | Carpenter | Oct. 12, 1886 |
| 1,651,033 | McClellan | Nov. 29, 1927 |
| 2,492,891 | Schall | Dec. 27, 1949 |
| 2,554,942 | Dobrowsky | May 29, 1951 |